United States Patent [19]

Katakura

[11] Patent Number: 5,668,776

[45] Date of Patent: Sep. 16, 1997

[54] VELOCITY MEASUREMENT APPARATUS OF MOVING OBJECT

[75] Inventor: Kageyoshi Katakura, Tokyo, Japan

[73] Assignee: Hitachi, Ltd., Tokyo, Japan

[21] Appl. No.: 601,942

[22] Filed: Feb. 15, 1996

[30] Foreign Application Priority Data

Feb. 23, 1995 [JP] Japan .................... 7-034916

[51] Int. Cl.$^6$ ......................................... G01S 13/58
[52] U.S. Cl. ......................................... 367/89
[58] Field of Search .......................... 367/89, 90, 91; 342/159, 160, 161, 114, 104, 25

[56] References Cited

U.S. PATENT DOCUMENTS 4,325,065 4/1982 Caputi, Jr. ................... 342/25

OTHER PUBLICATIONS

Katakura, JPn. J. Appl. Phys. vol. 34 (1995), pp. 2215–2518 May 1995.
Katakura et al., 1992 IEEE Ultrasonics Symposium 1187–1190.

Primary Examiner—Daniel T. Pihulic
Attorney, Agent, or Firm—Antonelli, Terry, Stout & Kraus, LLP.

[57] ABSTRACT

A velocity measurement apparatus is disclosed which is composed of a transmitter having a plurality of elements for transmitting a signal wave, a receiver having a plurality of elements for receiving a reflected signal from a target object, and a Fourier transformation processor for two-dimensionally Fourier transforming a two-dimensional received signal in an array direction and a time axial direction of the plurality of elements of the receiver. The two-dimensional received signal is derived by repeating the transmission and reception operations a plurality of times. The velocity measurement apparatus measures a moving velocity of the target object directing to the means for receiving.

19 Claims, 5 Drawing Sheets

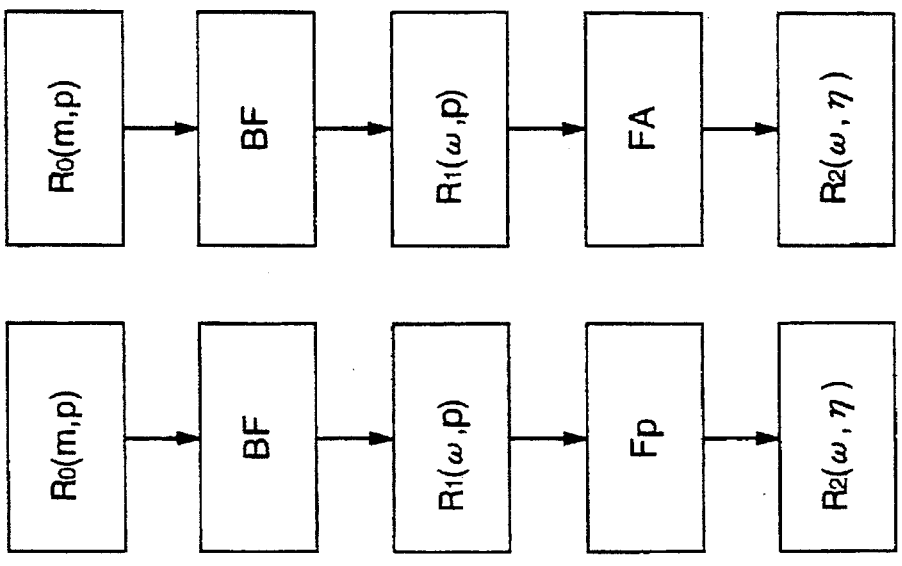

VELOCITY MEASUREMENT APPARATUS OF MOVING OBJECT

BACKGROUND THE INVENTION

The present invention relates to an axial velocity measurement apparatus using a signal wave for detecting an approaching target.

A method of measuring an axial direction velocity component of a target object utilizing the Doppler effect of ultrasonic wave is known (Jpn. J. Appl. Phys. Vol. 34 (1995), pp. 2515-2518, Pt. 1, No. 5B). Also, a method invented by the present inventor, which enables a measurement of a velocity component in the direction orthogonal to a progressing direction of an ultrasonic wave, involves transmitting an ultrasonic wave to receive a reflected signal from a particular direction by a plurality of elements, repeating the transmission/reception operations a plurality of times, Fourier transforming a received signal corresponding to a particular depth in an array direction, and performing a radial Fourier transformation, considering changes in the Fourier transformed result over time as a two-dimensional signal, to measure a velocity vector (1992 IEEE ULTRASONICS SYMPOSIUM 1187-1190).

SUMMARY OF THE INVENTION

In consideration of an apparatus for avoiding collisions of cars utilizing the normal Doppler effect, such an apparatus is not practical since it detects stationary objects such as electric-light poles and roadside trees located in sidewalks as objects approaching to a car because of axial velocity components these objects have, and therefore generates an erroneous alarm every time such an object is detected.

It is an object of the present invention to provide a velocity measurement apparatus which is capable of solving the problem mentioned above, specifically, measuring a relative velocity of a target object directing toward itself (in other words, an apparatus for detecting an approaching target equipped in a car for detecting an object approaching to the car) to detect a truly dangerous target object.

A signal wave such as an electro-magnetic wave, an ultrasonic wave, or the like is transmitted from a plurality of elements to a target object, and a reflected signal from the target object is received by a plurality of elements. The transmission/reception operations are repeated a plurality of times to derive received signals of the respective elements in a time-axial manner. The received signals are two-dimensionally Fourier transformed to measure a relative velocity vector of a target object approaching to itself.

The transmission/reception operations according to the present invention will be explained with reference to FIG. 1, wherein an ultrasonic wave is used as a signal wave by way of example. First, from transmitting elements 1 for transmitting ultrasonic waves shown in FIG. 1, ultrasonic wave signals TD (p=-P, -P+1 ..., P-1, +P, where p indicates the number of wave transmission) are sequentially transmitted at time intervals of T over a relatively wide insonification area 2. Here, a signal from a reflector (target object) moving in the circumferential direction is received by an array transducer for transmitting and receiving 3, and the curvature of a wave surface depending on the distance to the reflector is corrected by a concave delay-circuit 4. A received signal R(n, m, p) thus derived varies corresponding to the position of the reflector changing over time, as shown by waveforms 5, 6, 7 in FIG. 1, where m designates the element number of an element in the array transducer for transmitting and receiving 3, and n represents a sample number. A received signal $R_0(m, p) = R(n_0, m, p)$ of the received signal R, at specific time corresponding to a target distance (sample number is $n_0$), varies as shown by waveforms 8, 9, 10 in FIG. 1.

Thus, the spatial frequency of the received signal $R_0(m, p)$ varies over time corresponding to the reflector moving in the lateral direction, as shown in FIG. 2A. This signal is Fourier transformed (Fm) in the array direction of the elements in the array transducer for transmitting and receiving 3 to derive waveforms as shown in FIG. 2B, wherein a signal $R_1 (\omega, p)$ appear on an oblique linear line 11. Assuming herein that the elements in the array transducer for transmitting and receiving 3 are arranged at intervals of $d$, the signal $R_1 (\omega, p)$ is given by the following Equation (1):

$$R_1(\omega, p) = \Sigma R_0(m, p) \exp(-jm\omega d) \tag{1}$$

where $\omega$ is the spatial frequency, and $j$ is an imaginary number unit, and the summation is performed in a range from m=1 to m=M.

The gradient of the line 11 on which the signal $R_1 (\omega, p)$ appears corresponds to a velocity in the lateral direction of the reflector. When the reflector (target object) moves in the circumferential direction, since the distance between the center of the reflector and a central element of the array transducer for transmitting and receiving 3 is constant, the output (R1 ($\omega$, p)) derived from a Fourier transformation of the received signal $R_0$ (m, p) in the array direction of the elements has a fixed phase, as indicated by arrows in FIG. 2B. (Arrows in subsequent FIGS. 3B, 4B, 5A, 6A, 6B each indicate the phase of the output ($R_1 (\omega, p)$) derived from a Fourier transformation of the received signal $R_0$ (m, p) in the array direction of the elements, similarly to FIG. 2B.)

If the reflector simultaneously has a velocity component in the distance direction, a received signal exhibits changes in the phase as shown in FIG. 3A, and the phase of the signal $R_1 (\omega, p)$ rotates as shown in FIG. 3B. The phase rotation velocity corresponds to the velocity of the reflector in the distance direction. For this reason, if the reflector is moving in a fixed direction relative to the array transducer for transmitting and receiving 3, the signal $R_0$ (m, p) resents a constant spatial frequency as shown in FIG. 4A, with the phase rotating corresponding to an approaching velocity of the reflector. Thus, the signal $R_1 (\omega, p)$ is outputted on a vertical line $\omega = \omega_0$ as $R_1 (\omega_0, p)$, as shown in FIG. 4B. Here, $\omega_0$ corresponds to a moving direction of the reflector, and $R_1 (\omega_0, p)$ has the phase rotating relative to the transmitting time $p$.

From the fact that the phase rotation velocity corresponding to the velocity of the reflector in the axial direction, if the signal $R_1 (\omega, p)$ is Fourier transformed (Fp) with respect to the transmitting time $p$ on the respective lines a–A, b–B, ..., shown in FIG. 5A, a signal $R_2 (\omega, \eta)$ as shown in FIG. 5B is derived corresponding to the position on each line. The signal $R_2 (\omega, \eta)$ is given by the following Equation (2):

$$R_2(\omega, \eta) = \Sigma R_1(\omega, p) \exp(-j\eta p T) \tag{2}$$

where $\eta$ is the axial velocity of the reflector, and the summation is performed in a range from p=-P to p=P.

This output is derived as a large value at a position corresponding to the phase rotation velocity. On the other hand, if the orientation of the target object varies, the signal R1 ($\omega$, p) is inclined as shown in FIG. 3B, so that the signal $R_2 (\omega, \eta)$, which is the result of a Fourier transformation of $R_1 (\omega, p)$ with respect to the transmitting time $p$, becomes a smaller value. It will be understood from the foregoing that the system of the present invention measures a moving velocity in the radial direction only for a target object, the orientation of which is fixed relative to the array transducer of transmitting and receiving. A procedure for deriving $R_2$ ($\omega$, $\eta$) from $R_0$ (m, p) is shown in FIG. 9A.

With a relatively stationary target object presenting no changes in the distance with the array transducer for transmitting and receiving, a signal $R_1$ ($\omega$, p) as shown on the left side in FIG. 6A is derived, where the phase is always the same relative to the transmitting time p. On the other hand, with a target object presenting a relatively changing axial distance with the array transducer for transmitting and receiving, a signal as shown on the right side in FIG. 6A is derived, where the phase of the signal rotates over time. Thus, by calculating a difference between $R_1$ ($\omega$, p) at certain transmitting time R and $R_1$ ($\omega$, p) at an adjacent transmitting time p (for example, $\{R_1$ ($\omega$, p)$\}$−$\{R_1$ ($\omega$, p+1)$\}$ is calculated), the same phase signal is removed as shown in FIG. 6B, whereby a signal from a moving target object only can be derived. It is also effective to Fourier transform a signal, after subjected to the processing for selecting a moving target object (MTI: moving target indicator) as mentioned above, with respect to the transmitting time to derive $R_2$ ($\omega$, $\eta$). $R_2$ ($\omega$, $\eta$) derived in this manner is given, for example, by the following Equation (3):

$$R_2(\omega, \eta) = \Sigma\{R_1(\omega, p) - R_1(\omega, p+1)\}\exp(-j\eta pT) \quad (3)$$

where the summation is performed in a range from p=P to p=P.

It is known that a Fourier transformation in the time axial direction of a two-dimensional signal resulting from a Fourier transformation of a received signal in the array direction is equivalent to a two-dimensional Fourier transformation of the received signal. Therefore, by transmitting a signal wave to a target object to receive a reflected signal therefrom by a plurality of elements, repeating the transmission/reception operations a plurality of times, and two-dimensionally Fourier transforming a two-dimensional signal resulting from the repeated transmission/reception operations, a relative velocity vector of the target object can be measured as well.

Since the two-dimensional Fourier transformation does not depend on the order of the transformation, a received signal may first be Fourier transformed in the time axial direction (Fp, Equation (2)), and then the resulting two-dimensional signal may be Fourier transformed in the array direction (Fm, Equation (1)) to thereby accomplish similar processing. This procedure is shown in FIG. 9B. R1' in FIG. 9B represents the result derived by Fourier transforming the received signal in the time axial direction.

It is known from the Fourier projection theorem that projection processing and a one-dimensional Fourier transformation of a projected signal are equivalent to a two-dimensional Fourier transformation. Therefore, an equivalent procedure may be provided by the projection processing (PJ) and the one-dimensional Fourier transformation of the projected signal. This procedure is shown in FIG. 9C. R" in FIG. 9C represents the result of the projection processing (PJ).

Since the operation of Fourier transforming a received signal in the array direction (Equation (1)) is equivalent to a conventional beam formation, an equivalent procedure may be provided by a beam formation (BF) which converts (decomposes in bearing directions) the received signal into a received signal component incident to a transducer for transmitting and receiving from each direction, and by a Fourier transformation of the converted (decomposed) result as a two-dimensional signal in the time axial direction (Fp, Equation (2)). This procedure is shown in FIG. 9D. Here, the processing of Fourier transforming a two-dimensional signal in the time axial direction (Equation (2)) is generally equivalent to a frequency analysis (FA). A procedure utilizing the frequency analysis (FA) is shown in FIG. 9E. In Fourier transformation operations in two directions in a two-dimensional Fourier transformation, the results of the two-dimensional Fourier transformation do not depend on the order of the transformation, equivalent processing can be performed if the received signal $R_0$ (m, p) is subjected first to a Fourier transformation in the time axial direction (Equation (2)) or a frequency analysis, and then the transformed result is Fourier transformed in the array direction (Equation (1)).

The present invention is characterized by a velocity measurement apparatus which transmits a signal wave to a target object to receive a reflected signal from the target object by a plurality of elements, repeats the transmission/reception operations a plurality of times, and two-dimensionally Fourier transforms a two-dimensional signal (received signal) resulting from the transmission/reception operations to measure a relative velocity vector of the target object. In the two-dimensional Fourier transformation, the received signal is Fourier transformed in the array direction, and then the resulting two-dimensional signal is Fourier transformed in the time axial direction. Alternatively, the received signal is Fourier transformed in the time axial direction, and then the resulting two-dimensional signal is Fourier transformed in the array direction. The Fourier transformation in the time axial direction may involve a modification to a previous Fourier transformation in the time axial direction.

Also from the Fourier projection theory, the two-dimensional Fourier transformation is carried out by projection processing of a received signal and a one-dimensional Fourier transformation of a projected signal. The two-dimensional Fourier transformation operation may be performed by a unit for converting (decomposing in bearing directions) a received signal at specific time to a received signal component incident to a transducer for transmitting and receiving from each direction, and a unit for Fourier transforming the converted (decomposed) result in the time axial direction or a unit for executing a frequency analysis on the converted result, or may be performed by a unit for Fourier transforming the converted (decomposed) result in the time axial direction or a unit for executing a frequency analysis on the converted result, and a unit for Fourier transforming the Fourier-transformed or analyzed result in the array direction.

The present invention is also characterized in that a detection result of a relative velocity vector of a target object is outputted in the form of an acoustic signal (sound expressing a language, particular meaning, for example, an alarm, or the like) or an optical signal (which may indicate that the target object is approaching by filling the wheel screen of display unit with a particular color).

As the signal wave, an ultrasonic signal, an electromagnetic wave signal or the like may be used. The velocity measurement apparatus may be equipped, for example, in cars, ships which navigate rivers, submerging submarines, aircraft and so on, and utilized for their safe operations.

According to the present invention, it is possible to measure only the velocity of a target object approaching to itself (for example, an apparatus for detecting an approaching object equipped in a car for detecting an object approaching the car). A signal wave is transmitted to receive a reflected signal from the target object by a plurality of elements, the transmission/reception operations are repeated a plurality of times, and received signals on the respective elements are detected in a time axial manner. A resulting two-dimensional signal is two-dimension Fourier transformed to measure a relative velocity vector of only the target object approaching to itself. In this way, the velocity can be measured only for the target object approaching to itself, so that a truly dangerous object can only be detected.

BRIEF DESCRIPTION OF THE DRAWINGS

FIGS. 9A–9E are diagrams for explaining processing procedures in the embodiment of the present invention.

DESCRIPTION OF THE PREFERRED EMBODIMENTS

Figure 1:
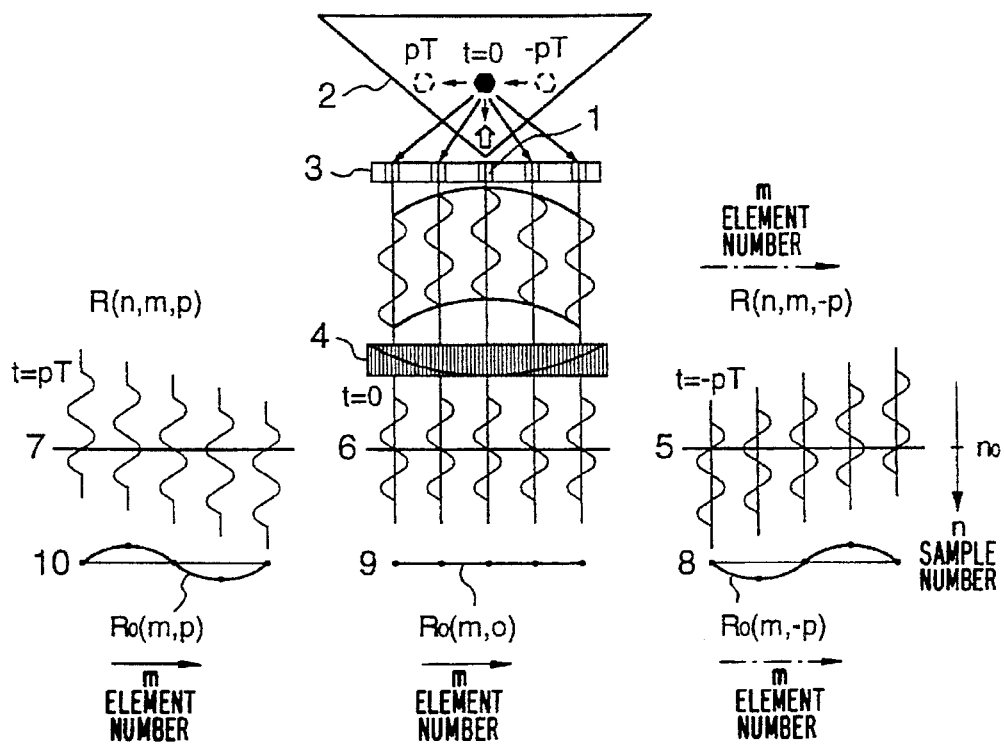
FIG. 1 is a diagram for explaining a reception operation in the present invention.
Figure 2A:
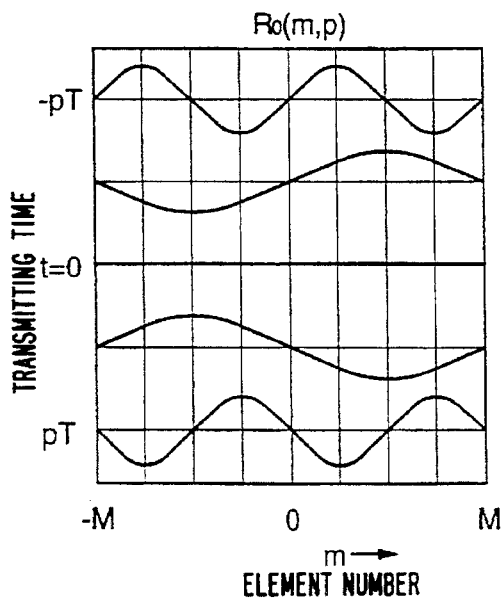
FIG. 2A is a graph for explaining a received signal from a target object moving in the circumferential direction in the present invention.
Figure 2B:
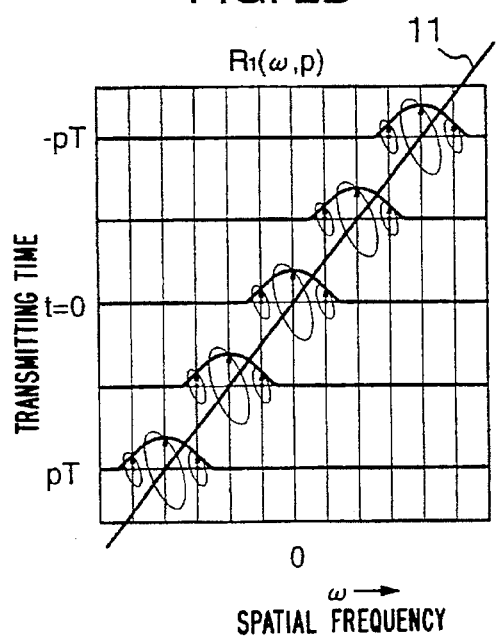
FIG. 2B is a graph for explaining changes in the phase of an output resulting from a one-dimensional Fourier transformation in the element array direction of the received signal from the target object moving in the circumferential direction in the present invention.
Figure 3A:
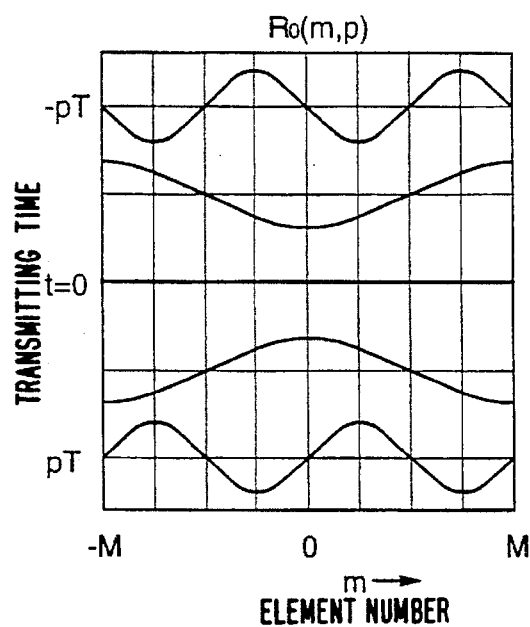
FIG. 3A is a graph for explaining a received signal from a target object which has a velocity component in the distance direction in the present invention.
Figure 3B:
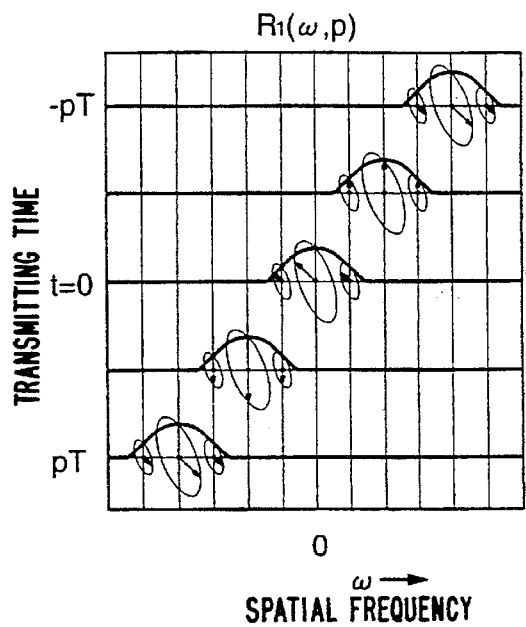
FIG. 3B is a graph for explaining changes in the phase of an output resulting from a one-dimensional Fourier transformation in the element array direction of the received signal from the target object which has a velocity component in the distance direction in the present invention.
Figure 4A:
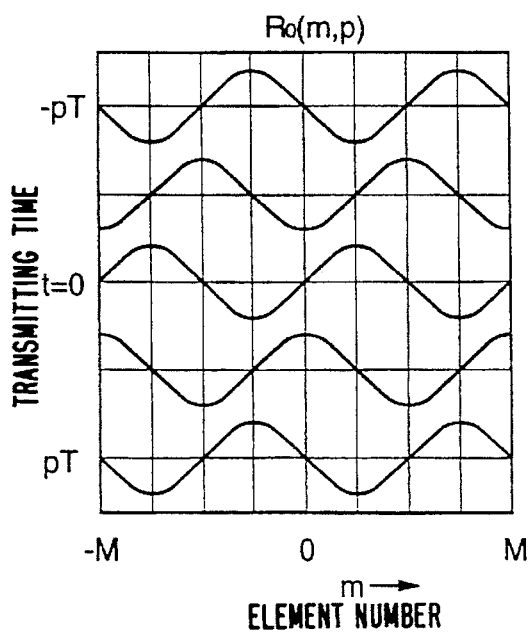
FIG. 4A is a graph for explaining a received signal from a target object moving in a fixed direction relative to an array transducer for transmitting and receiving in the present invention.
Figure 4B:
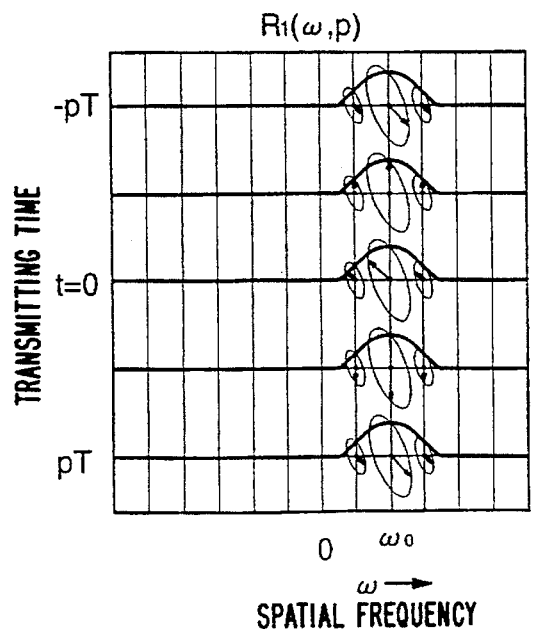
FIG. 4B is a graph for explaining changes in the phase of an output resulting from a Fourier transformation in the element array direction of the received signal from the target object moving in a fixed direction relative to the array transducer for transmitting and receiving in the present invention.
Figure 5A:
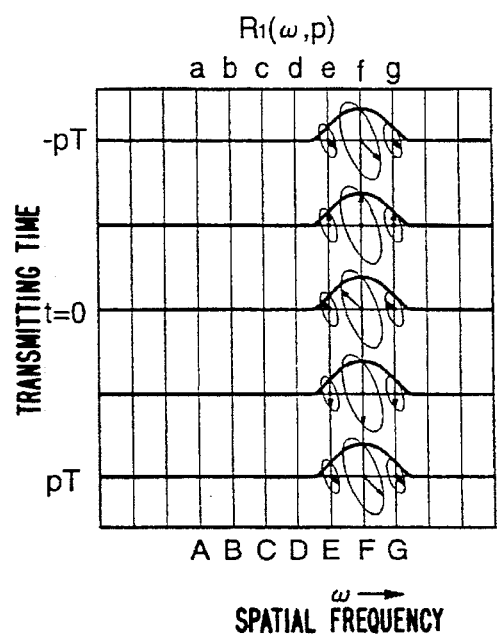
FIG. 5A is a graph for explaining changes in the phase of an output resulting from a Fourier transformation in the element array direction of the received signal from the target object moving in a fixed direction relative to the array transducer for transmitting and receiving in the present invention.
Figure 5B:
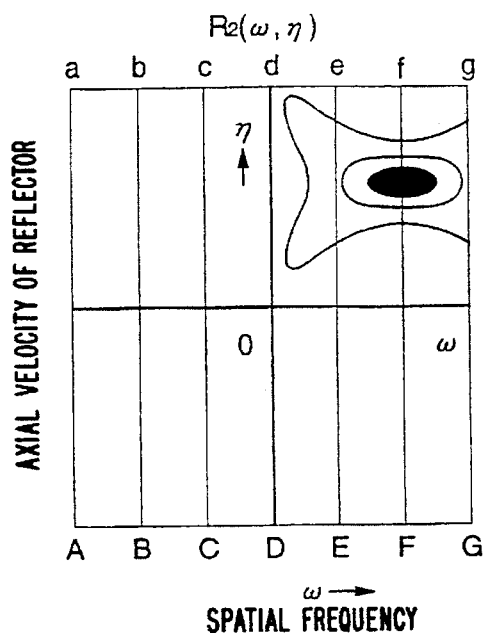
FIG. 5B is a graph for explaining an output of a Fourier transformation with respect to the transmitting time in FIG. 5A.
Figure 6A:
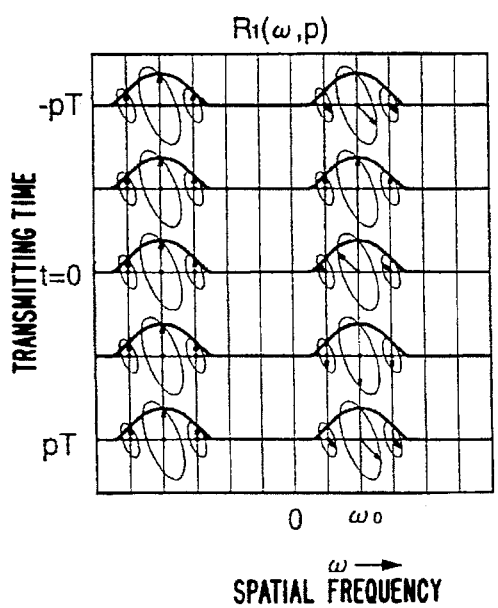
FIGS. 6A, 6B are graphs for explaining processing for detecting an object moving relative to the array transducer for transmitting and receiving in the present invention.
Figure 6B:
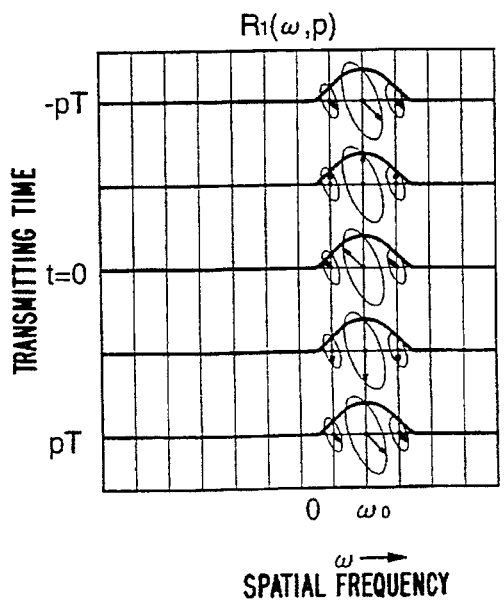
Figure 7:
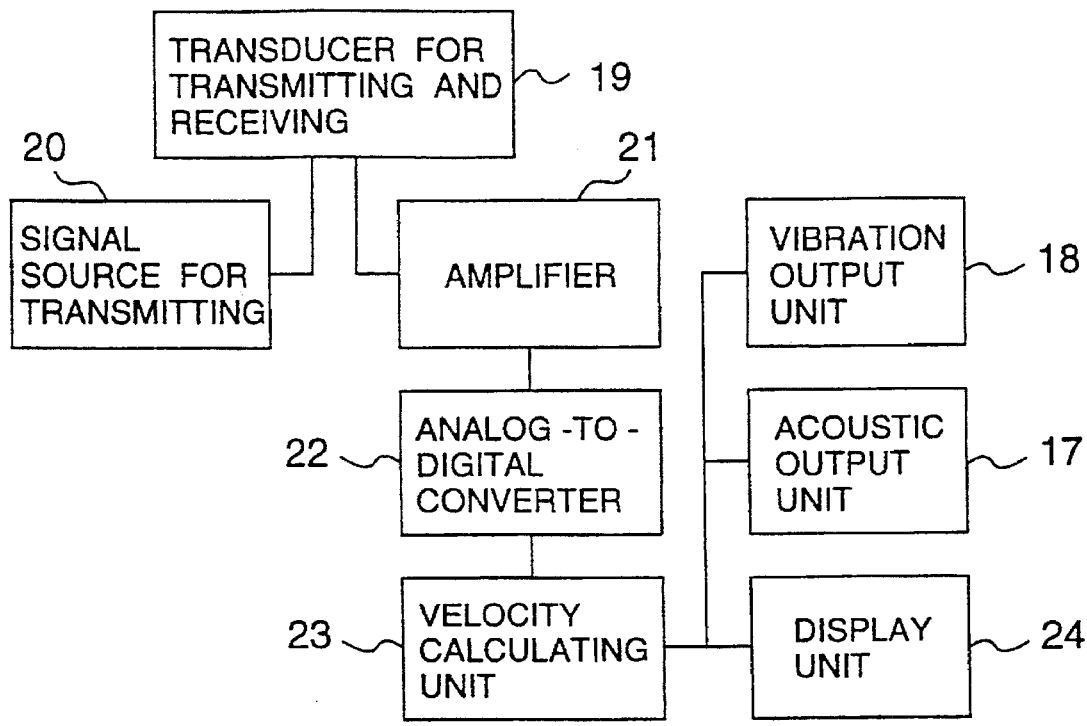
FIG. 7 is a block diagram showing an embodiment of the present invention.

FIG. 7 shows the configuration of an apparatus according to the present invention. An electric signal from a signal source for transmitting 20 is applied to a transducer for transmitting and receiving 19. This transducer for transmitting and receiving may be an antenna array in a configuration using electro-magnetic waves or an array of piezoelectric elements in a configuration using ultrasonic waves. From a component (element) of the transducer for transmitting and receiving 19, a signal wave such as an electromagnetic wave, an ultrasonic wave or the like is transmitted within an observation view area (generally, an angular range of approximately 30 in the forward direction relative to a running direction). A reflected signal back from a target object is received by all elements of the transducer for transmitting and receiving 19. The transmission/reception operations as mentioned above are repeated a plurality of times to detect received signals by the respective elements in a time axial manner. Then, the received signals are converted to discrete values by an analog-to-digital converter 22 and stored as a two-dimensional signal relative to the position of the receiving elements and transmitting time. The two-dimensional received signal is two-dimensionally Fourier transformed by a velocity calculating unit 23 to measure a velocity vector only for an object approaching to itself, and the result of a determination as to the velocity vector of the object is displayed on display units 17, 18 and 24 in a variety of display formats. The apparatus of the present invention is applicable to a wide variety of fields including safety devices for cars, torpedo detection, missile detection, and so on.

In the following, a description will be made on an apparatus for detecting a velocity vector of a moving object using ultrasonic waves. As shown in FIG. 7, a portion of the transducer for transmitting and receiving 19 having a plurality of elements arranged in an array form is vibrated by a signal from the signal source for transmitting 20 to generate ultrasonic waves in a target area. A signal from a reflector is reception received by the transducer for transmitting and receiving 19. This received signal is amplified by an amplifier 21, converted to a digital signal by the analog-to-digital converter 22, and inputted to the velocity calculating unit 23. The velocity calculating unit 23 performs the velocity measurement processing according to the present invention, and displays the presence or absence of a collision causative object or a relative velocity on the display unit 24 with hue, luminance and numerals. Also, the acoustic output unit 17 outputs an acoustic signal having a frequency corresponding to the velocity of the target object or a voice signal representing "Look out" or the like. As to an output of the acoustic output unit 17, a threshold value may be set for the distance to or the velocity of the target object such that the acoustic output unit 17 is controlled based on the threshold value to output an acoustic signal. Also, the acoustic output unit 17 may be in a stereo phonic configuration. Since, ω in $R_2$ (ω, η) corresponds to an approaching direction of a collision causative object, phase difference between signals entering the respective ears is adjusted so that a direction in which the target object exists can be corresponded to a sound source localization position due to the binaural effect of an acoustic stereo sound system. In addition, the result is outputted in the form of vibrations produced by a vibration output unit 18. It will be understood that other processing generally performed on normal signal waves is of course utilized in combination.

A typical array transducer for transmitting and receiving ultrasonic waves constituting an apparatus for detecting an approaching object equipped in a car has an overall length of approximately 1 m and an element pitch of approximately 3 cm, and is driven by frequencies ranging approximately from 10 KHz to dozens KHz. When electro-magnetic waves are used, frequencies are preferably in a range of 10 GHz to 30 GHz.

While the above description has been made in connection with a measurement in a two-dimensional space, a measurement of a three-dimensional vector velocity can also be made by extending all the associated processing such as the Fourier transforms to apply to a three-dimensional space, for example, by replacing a one-dimensional Fourier transformation with a two-dimensional Fourier transformation. In other words, it is possible to detect a target object approaching to itself in the three-dimensional space.

Figure 8:
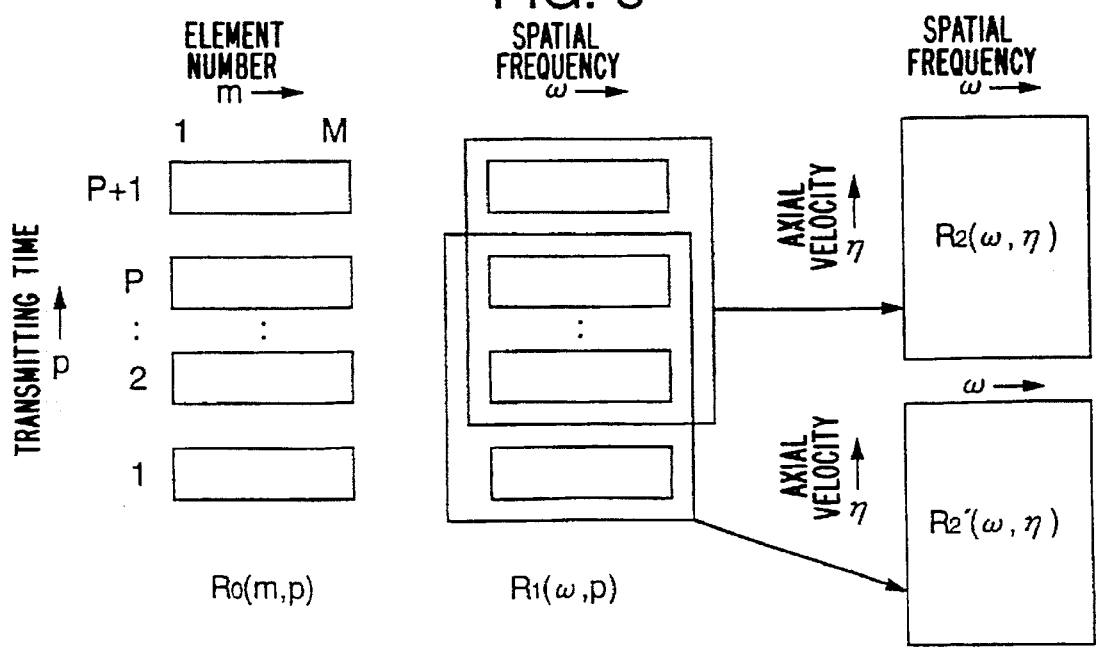
FIG. 8 is a diagram for explaining sequential operation processing in the embodiment of the present invention.

The two-dimensional Fourier transformation used herein may be executed by a fast operation procedure employing a simple method shown in FIG. 8 for sequentially processing newly received signals, other than a normal procedure involving batch processing. A signal $R_0$ (m, p) is derived corresponding to each transmitting time $\underline{p}$, and is sequentially Fourier transformed with respect to $\underline{m}$ to obtain $R_1$ ($\omega$, p). Then, a portion from p=1 to p=P of $R_1$ ($\omega$, p+1) is Fourier transformed with respect to $\underline{p}$ to derive $R_2$ ($\omega$, $\eta$) as shown in FIG. 8. $R_1$ ($\omega$, p) and $R_2$ ($\omega$, $\eta$) are expressed by the following equations (4), (5), respectively:

$$R_1(\omega, p) = \Sigma R_0(m, p) \exp(jm\omega) \quad (4)$$

$$R_2((\omega, \eta) = \Sigma R_1(\omega, p) \exp(jp\eta) \quad (5)$$

where the summation is performed in a range from m=1 to m=M in Equation (4) and in a range from p=1 to p=P in Equation (5).

Next, a new received signal $R_0$ (m, P+1) is derived corresponding to p=P+1. This signal is Fourier transformed to derive $R_1$ ($\omega$, P+1). A portion from p=2 to p=P of $R_1$ ($\omega$, P+1) is Fourier transformed with respect to $\underline{p}$ to derive new $R_2$ ($\omega$, $\eta$). This new $R_2(\omega, \eta)$ may be given as $R_2'$ ($\omega$, $\eta$) by Equation (6) and Equation (7):

$$R_2'(\omega, \eta) = \Sigma R_1(\omega, p)\exp(jp\eta) \quad (6)$$

$$\begin{aligned}R_2'(\omega, \eta) &= \Sigma R_1(\omega, p)\exp(jp\eta) - \\ &\quad R_1(\omega, 1)\exp(jp) + \\ &\quad R_1(\omega, p+1)\exp\{j(p+1)\eta\} \\ &= R_2(\omega, \eta) - R_1(\omega, 1)\exp(j\eta) + \\ &\quad R_1(\omega, p+1)\exp\{j(p+1)\eta\}\end{aligned} \quad (7)$$

Thus, from the fact that $R_2'$ ($\omega$, $\eta$) can be calculated by adding $R_1$ ($\omega$, p) to and subtracting $R_1$ ($\omega$, p) from previous $R_2$ ($\omega$, $\eta$), the Fourier transformation with respect to $\underline{p}$ is not required, so that the calculation for deriving $R_2'$ ($\omega$, $\eta$) is significantly simplified. It should be noted that the summation in Equation (6) is performed in a range from p=2 to p=P+1, and the summation in Equation (7) in a range from p=1 to p=P.

I claim:

1. A velocity measurement apparatus comprising:
   a transducer for transmitting a signal wave to a target object repeatedly a plurality of times at a predetermined time interval and for receiving a reflected signal from said target object repeatedly a plurality of times, said transducer having a plurality of elements arrayed in a direction; and
   a velocity calculating unit to calculate a moving velocity in a radial direction for said target object approaching said transducer and being in a fixed direction relative to said transducer, said velocity calculating unit comprising Fourier transforming means for two-dimensionally Fourier transforming a two-dimensional received signal at a specific time of the reflected signal by said transducer in an array direction of said plurality of elements and in a time axis direction defined by the transmitting time of the signal wave to said target object repeatedly a plurality of times.

2. A velocity measurement apparatus comprising:
   a transducer for transmitting a signal wave to a target object repeatedly a plurality of times at a predetermined time interval and for receiving a reflected signal from said target object repeatedly a plurality of times, said transducer having a plurality of elements arrayed in a direction; and
   a velocity calculating unit to calculate a moving velocity in a radial direction for said target object approaching said transducer and being in a fixed direction relative to said transducer, said velocity calculating unit comprising first Fourier transforming means for one-dimensional Fourier transforming a two-dimensional received signal at a specific time of the reflected signal by said transducer in an array direction of said plurality of elements, and second Fourier transforming means for one-dimensional Fourier transforming a signal obtained by said first Fourier transforming means in a time axis direction defined by the transmitting time of the signal wave to said target object repeatedly a plurality of times.

3. A velocity measurement apparatus according to claim 2, wherein said second Fourier transforming means calculates one-dimensional Fourier transformation in said time axis direction by a modification of a previously executed result obtained by said one-dimensional Fourier transformation in said time axis direction without an additional one-dimensional Fourier transformation in said time axis direction.

4. A velocity measurement apparatus comprising:
   a transducer for transmitting a signal wave to a target object repeatedly a plurality of times at a predetermined time interval and for receiving a reflected signal from said target object repeatedly a plurality of times, said transducer having a plurality of elements arrayed in a direction; and
   a velocity calculating unit to calculate a moving velocity in a radial direction for said target object approaching said transducer and being in a fixed direction relative to said transducer, said velocity calculating unit comprising first Fourier transforming means for one-dimensional Fourier transforming a two-dimensional received signal at a specific time of the reflected signal by said transducer in a time axis direction defined by the transmitting time of the signal wave to said target object repeatedly a plurality of times, and second Fourier transforming means for one-dimensional Fourier transforming a signal obtained by said first Fourier transforming means in an array direction of said plurality of elements.

5. A velocity measurement apparatus comprising:
   a transducer for transmitting a signal wave to a target object repeatedly a plurality of times at a predetermined time interval and for receiving a reflected signal from said target object repeatedly a plurality of times, said transducer having a plurality of elements arrayed in a direction; and
   a velocity calculating unit to calculate a moving velocity in a radial direction for said target object approaching said transducer and being in a fixed direction relative to said transducer, said velocity calculating unit comprising projecting means for projecting a two-dimensional received signal at a specific time of the reflected signal by said transducer, and Fourier transforming means for one-dimensional Fourier transforming a projected signal obtained by said projecting means.

6. A velocity measurement apparatus comprising:

a transducer for transmitting a signal wave to a target object repeatedly a plurality of times at a predetermined time interval and for receiving a reflected signal from said target object repeatedly a plurality of times, said transducer having a plurality of elements arrayed in a direction; and a velocity calculating unit to calculate a moving velocity in a radial direction for said target object approaching said transducer and being in a fixed direction relative to said transducer, said velocity calculating unit comprising converting means for converting received signals by said transducer elements to a received signal component incident to said transducer from each direction, and Fourier transforming means for one-dimensional Fourier transforming a signal obtained by said converting means in a time axis direction defined by the transmitting time of the signal wave to said target object repeatedly a plurality of times.

7. A velocity measurement apparatus comprising:

a transducer for transmitting a signal wave to a target object repeatedly a plurality of times at a predetermined time interval and for receiving a reflected signal from said target object repeatedly a plurality of times, said transducer having a plurality of elements array in a direction; and a velocity calculating unit to calculate a moving velocity in a radial direction for said target object approaching said transducer and being in a fixed direction relative to said transducer, said velocity calculating unit comprising converting means for converting received signals by said transducer elements to a received signal component incident to said transducer from each direction, and analysis means for performing frequency analysis on a signal obtained by said converting means.

8. A velocity measurement apparatus comprising:

a transducer for transmitting a signal wave to a target object repeatedly a plurality of times at a predetermined time interval and for receiving a reflected signal from said target object repeatedly a plurality of times, said transducer having a plurality of elements arrayed in a direction; and a velocity calculating unit to calculate a moving velocity in a radial direction for said target object approaching said transducer and being in a fixed direction relative to said transducer, said velocity calculating unit comprising analysis means for performing frequency analysis on a two-dimensional received signal at a specific time of the reflected signal by said transducer, and Fourier transforming means for one-dimensional Fourier transforming a signal obtained by said analysis means in an array direction of said plurality of elements.

9. A velocity measurement apparatus according to claim 1, wherein said moving velocity of said target object is outputted in the form of an acoustic signal.

10. A velocity measurement apparatus according to claim 1, wherein said moving velocity of said target object is outputted in the form of an optical signal.

11. A velocity measurement apparatus according to claim 1, wherein said signal wave is an ultrasonic wave signal.

12. A velocity measurement apparatus according to claim 1, wherein said signal wave is an electro-magnetic wave signal.

13. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said moving velocity calculated from two-dimensionally Fourier transforming a two-dimensional received signal at a specific time of the reflected signal by said transducer in an array direction of said plurality of elements and in a time axis direction defined by the transmitting time of the signal wave to said target object repeatedly a plurality of times.

14. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said calculating the moving velocity comprising the substeps of:

(i) first one-dimensional Fourier transforming a two-dimensional received signal at a specific time of the reflected signal by said transducer in an array direction of said plurality of elements; and (ii) second one-dimensional Fourier transforming a signal obtained in the substep (i) in a time axis direction defined by the transmitting time of the signal wave to said target object repeatedly a plurality of times.

15. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said calculating the moving velocity comprising the substeps of:

(i) one-dimensional Fourier transforming a two-dimensional received signal at a specific time of the reflected signal by said transducer in a time axis direction defined by the transmitting time of the signal wave to said target object repeatedly a plurality of times; and (ii) one-dimensional Fourier transforming a signal obtained in the substep (i) in an array direction of said plurality of elements.

16. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said calculating the moving velocity comprising the substeps of:

(i) projecting a two-dimensional received signal at a specific time of the reflected signal by said transducer; and (ii) one-dimensional Fourier transforming a projected signal obtained in the substep (i).

17. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said calculating the moving velocity comprising the substeps of:

(i) converting received signals by said transducer elements to a received signal component incident to said transducer from each direction; and (ii) one-dimensional Fourier transforming a signal obtained in the substep (i) in a time axis direction defined by the transmitting time of the signal wave to said target object repeatedly a plurality of times.

18. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said calculating the moving velocity comprising the substeps of:

(i) converting received signals by said transducer elements to a received signal component incident to said transducer from each direction; and (ii) performing frequency analysis on a signal obtained in the substep (i).

19. A velocity measurement method comprising the steps of:

(1) transmitting a signal wave to a target object repeatedly a plurality of times at a predetermined time interval from a transducer having a plurality of elements arrayed in a direction, and receiving a reflected signal from said target object repeatedly a plurality of times by said transducer; and (2) calculating a moving velocity in a radial direction for said target object approaching said transducer and being in a fixed direction relative to said transducer, said calculating the moving velocity comprising the substeps of:

(i) performing frequency analysis on a two-dimensional received signal at a specific time of the reflected signal by said transducer; and (ii) one-dimensional Fourier transforming a signal obtained in the substep (i) in an array direction of said plurality of elements.

* * * * *